(12) United States Patent
Chakraborty

(10) Patent No.: US 6,855,087 B2
(45) Date of Patent: Feb. 15, 2005

(54) AXLE ASSEMBLY

(75) Inventor: Jyotsnamoy Chakraborty, Plymouth, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/299,192

(22) Filed: Nov. 19, 2002

(65) Prior Publication Data

US 2004/0097322 A1 May 20, 2004

(51) Int. Cl.[7] .............................................. F16H 48/08
(52) U.S. Cl. .................. 475/230; 475/225; 74/665 GC; 74/665 GE
(58) Field of Search .................................. 475/225, 230; 74/665 GC, 665 GB, 665 GA, 665 G, 665 R, 417, 420, 665 GE

(56) References Cited

U.S. PATENT DOCUMENTS

| | | |
|---|---|---|
| 1,244,223 A | 10/1917 | McInish |
| 1,384,483 A | 7/1921 | Penrod |
| 1,393,208 A | 10/1921 | Erickson et al. |
| 1,464,684 A | 8/1923 | Stoppenbach |
| 1,514,522 A | 11/1924 | Hilmes |
| 1,613,371 A | 1/1927 | Balaun |
| 1,631,996 A | 6/1927 | Wirrer |
| 1,754,604 A | 4/1930 | Buckendale |
| 1,858,773 A | 5/1932 | Gurney |
| 1,920,175 A | 8/1933 | Hollos |
| 2,196,368 A | 4/1940 | Thomson |
| 2,873,615 A * | 2/1959 | Wiken ................ 74/665 GC X |
| 3,374,687 A | 3/1968 | Vogt |
| 4,188,837 A * | 2/1980 | Bendall ............. 74/665 GB X |
| 4,266,436 A | 5/1981 | Reppert |
| 4,287,790 A * | 9/1981 | Fujiwara et al. ........ 74/665 GB |
| 4,297,907 A | 11/1981 | Bossler, Jr. et al. |
| 4,714,129 A | 12/1987 | Mueller |
| 4,762,022 A * | 8/1988 | Johnshoy ................. 475/225 X |
| 5,319,418 A * | 6/1994 | Fujimoto et al. ... 74/665 GC X |
| 5,358,457 A | 10/1994 | Braun |
| 6,095,005 A | 8/2000 | Tanzer et al. |
| 6,364,803 B1 | 4/2002 | Barnholt et al. |
| 6,378,638 B1 | 4/2002 | Mizon et al. |

FOREIGN PATENT DOCUMENTS

| | | | | |
|---|---|---|---|---|
| JP | 363097423 | * | 4/1988 | ............ 74/665 GC |
| JP | 406183275 | * | 7/1994 | ............... 74/665 G |

* cited by examiner

Primary Examiner—Ha Ho
(74) Attorney, Agent, or Firm—Jones Day

(57) ABSTRACT

An axle assembly is provided for transmitting power between a vehicle's drive shaft and the driven wheels of the vehicle. The axle assembly includes at least two crown wheels that are rotatably fixed together and at least two driven gears that are rotatably coupled to the drive shaft of the vehicle. The axle assembly also includes at least two driving gears coupled between the at least two driven gears and the at least two crown wheels, and a mechanism coupled to the drive shaft between the at least two driven gears for rotating each of the driven gears in a direction that is different from the rotation of the other driven gear. A method for varying the axle ratio of an axle assembly and a method for adjusting the backlash in an axle assembly are also provided.

15 Claims, 7 Drawing Sheets

AXLE ASSEMBLY

FIELD OF THE INVENTION

The claimed invention relates to an axle assembly. In particular, the claimed invention relates to a split torque axle assembly for use in a vehicle.

BACKGROUND OF THE INVENTION

Motor vehicles use an axle assembly to drive the wheels of the vehicle. Many vehicles use a single crown wheel driven by a gear set that is coupled to the drive shaft. The drive shaft is connected to the engine and the transmission of the vehicle while the gear set is coupled to the wheels of the vehicle. Split torque axle assemblies have been designed to split the torque from the drive shaft in two parallel paths for driving a pair of crown wheels. By splitting the torque from the drive shaft into two separate paths to drive two crown wheels, the torque applied to the crown wheels is reduced. As a result, smaller crown wheels can be utilized for the same or greater torque. Smaller crown wheels are desirable because they provide greater clearance between the drive train of the vehicle and the ground, take up less room under the vehicle, and are generally lighter in weight, among other benefits.

Differential's are also known for use in axle assemblies. Differentials allow the wheels of a vehicle to spin at different speeds under certain circumstances, such as when the vehicle turns around corners. Limited slip differentials are a form of differential that transmits torque to a non-spinning wheel and limits the amount of torque that is applied to a spinning or slipping wheel.

SUMMARY

According to one embodiment of the invention, an axle assembly is provided for transmitting power between a drive shaft and driven wheels of a vehicle, with first and second half shafts coupled to the driven wheels. The axle assembly comprises at least two crown wheels, at least two driven gears, at least two driving gears, and a mechanism coupled to the drive shaft between the at least two driven gears for rotating the driven gears in an opposite direction to one another. The at least two crown wheels are fixed to one another for rotation together about an axle axis, which is defined by the half shafts that are coupled to the driven wheels. The at least two crown wheels comprise a first crown wheel and a second crown wheel. The at least two driven gears are rotatably coupled to the drive shaft and comprise a first driven gear and a second driven gear. Each of the at least two driving gears is rotatably coupled between one of the driven gears and one of the crown wheels. The driving gears are for driving the rotation of the at least two crown wheels and comprise a third driving gear and a fourth driving gear.

In another embodiment, an axle assembly is provided for transmitting power between a drive shaft and driven wheels of a vehicle, with first and second half shafts being coupled to the driven wheels. The axle assembly includes a drive shaft gear positioned on the drive shaft, a driven gear set, a driving gear set, and a crown wheel gear set. The driven gear set is rotatably coupled to the drive shaft gear and comprises at least two driven gears and an idler gear. The drive shaft gear is positioned between the two driven gears and the idler gear is positioned between the drive shaft gear and one of the driven gears. The idler gear is for changing the direction of rotation of one of the driven gears so that the at least two driven gears rotate in different directions. The driving gear set comprises at least two driving gears, with each driving gear being coupled to one of the driven gears. The crown wheel gear set comprises at least two crown wheel gears that are rotatably fixed to one another, with each of the crown wheel gears being coupled to one of the driving gears. The drive shaft gear rotates the driven gear set, which rotates the driving gear set, which rotates the crown wheel gear set, which rotates the first and second half shafts to drive the driven wheels.

In another embodiment, a method of varying the axle ratio of an axle assembly comprises providing the axle assembly discussed above, with the at least two driven gears having a first diameter. The method also comprises replacing the at least two driven gears with at least two replacement gears having a second diameter. The second diameter is different from the first diameter.

In yet another embodiment, an axle assembly is provided for transmitting power between a drive shaft and driven wheels of a vehicle, with first and second half shafts being coupled to the driven wheels. The axle assembly includes a crown wheel gear set, a driven gear set, a driving gear set, and a chain. The crown wheel gear set comprises at least a first crown wheel and a second crown wheel, with the first and second crown wheels being rotatably fixed to one another. The driven gear set is coupled between the drive shaft of the vehicle and the crown wheel gear set. The driven gear set comprises at least two driven gears configured to rotate in a direction different from one another. The driving gear set is coupled between the driven gear set and the crown wheel gear set and comprises at least two driving gears configured to rotate in a direction different from one another. The chain is coupled between the drive shaft and at least one of the driven gears.

In a further embodiment, a method for varying the axle ratio of an axle assembly comprises providing the axle assembly discussed above, where the at least two driven gears comprise at least a first driven gear and a second driven gear and the first driven gear has a first diameter and the second driven gear has a third diameter. The axle assembly further includes a drive shaft gear coupled between the first and second driven gears, with the drive shaft gear having a third diameter. The method further includes replacing the drive shaft gear with a replacement drive shaft gear, replacing the first driven gear with a replacement driven gear, and replacing the chain with a differently sized replacement chain.

In yet another aspect of the invention, a method of adjusting the backlash within an axle assembly comprises providing one of the axle assemblies described above, with the first driven gear being positioned on a first driven gear axle, the second driven gear being positioned on a second driven gear axle, and the idler gear being positioned on an idler gear axle, and at least one of the first and second driven gears and idler gear being splined to their respective axles. The method also includes moving an axial position of at least one of the first and second driven gears and the idler gear until the backlash within the axle assembly is adjusted. The method further includes fixing the axial location of the at least one of the first and second driven gears and idler gear.

In another embodiment, a method of adjusting the backlash within an axle assembly comprises providing one of the axle assemblies described above, with at least one of the first driven gear and the drive shaft gear being splined to its respective axle. The method also includes moving an axial position of at least one of the first driven gear and the drive shaft gear until the backlash of the axle assembly is adjusted. The method further includes fixing the axial location of the at least one of the first driven gear and the drive shaft gear.

BRIEF DESCRIPTION OF THE DRAWING FIGURES

DETAILED DESCRIPTION OF THE INVENTION

Figure 1:
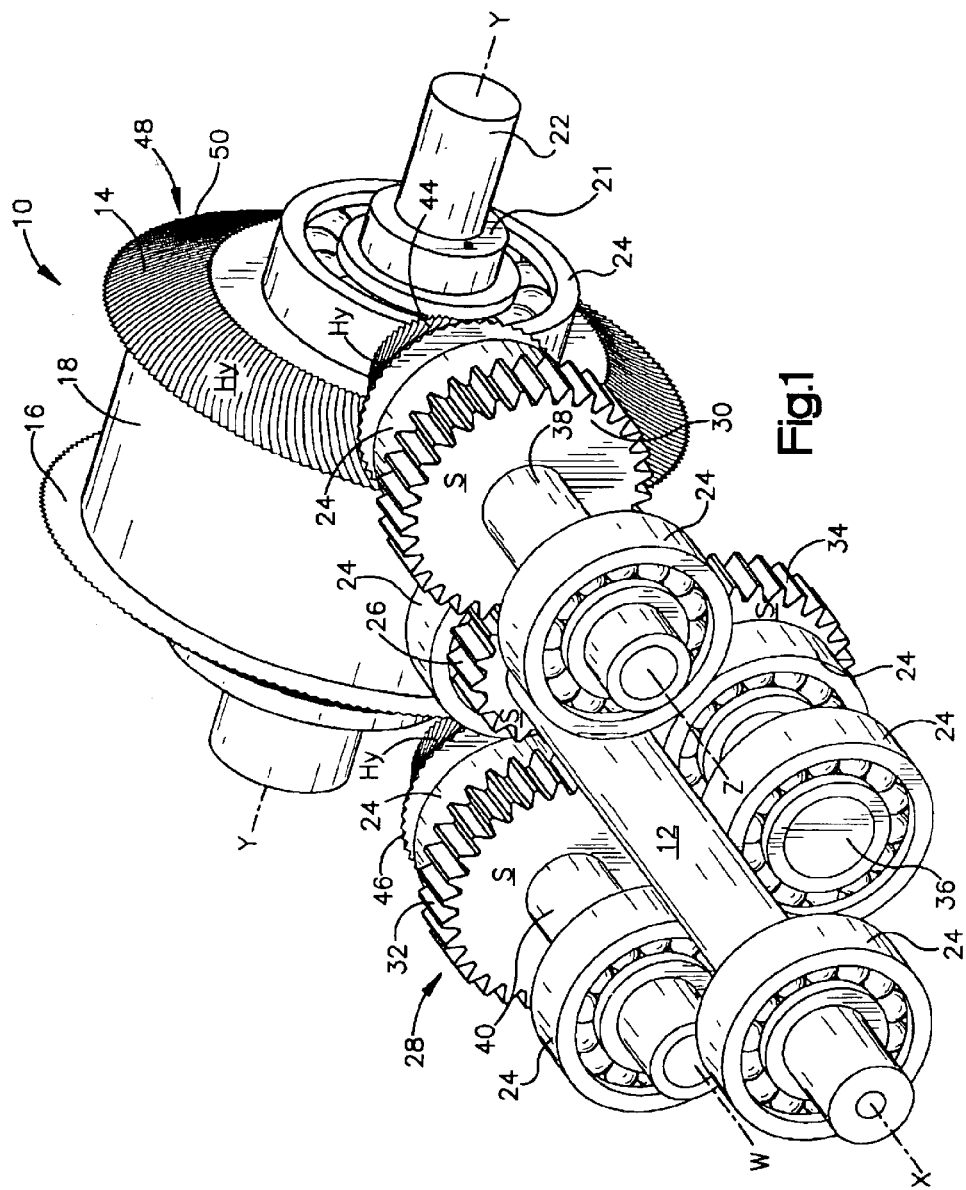
FIG. 1 is a perspective view of a first embodiment of the axle assembly of the invention.

The present invention concerns a split torque axle assembly 10. Torque from a vehicle's drive shaft 12 is split between two parallel torque transmission paths 72, 74 to drive two separate crown wheels 14, 16, which are fixed to one another. The crown wheels 14, 16 are fixed to the differential casing 18 and a differential mechanism 20, as known by those of skill in the art, is positioned inside the differential casing 18 and operatively associated with the casing 18. Two half-shafts 22 are coupled to the differential mechanism 20 and the half-shafts 22 are connected to the driven wheels of a vehicle (not shown).

By splitting the power from the drive shaft 12 between two parallel torque transmission paths 72, 74, the torque from the drive shaft 12 is split between the two crown wheels 14, 16. Because of the split in torque, the torque that is transmitted to the crown wheels 14, 16 is greatly reduced relative to prior designs that utilized a single crown wheel and a single torque transmission path. The size of the crown wheels 14, 16 and associated gear sets is determined by the maximum application of torque from the vehicle's engine. Since each torque transmission path 72, 74 of the current invention carries half the design torque, the gears can be made smaller in size. As a result, the entire axle assembly 10 is smaller than current axle assemblies of equal torque capacity. Smaller gears are advantageous in that they generally produce less noise and vibration. They also weigh less than larger gears and take up less room under the vehicle chassis.

Figure 2:
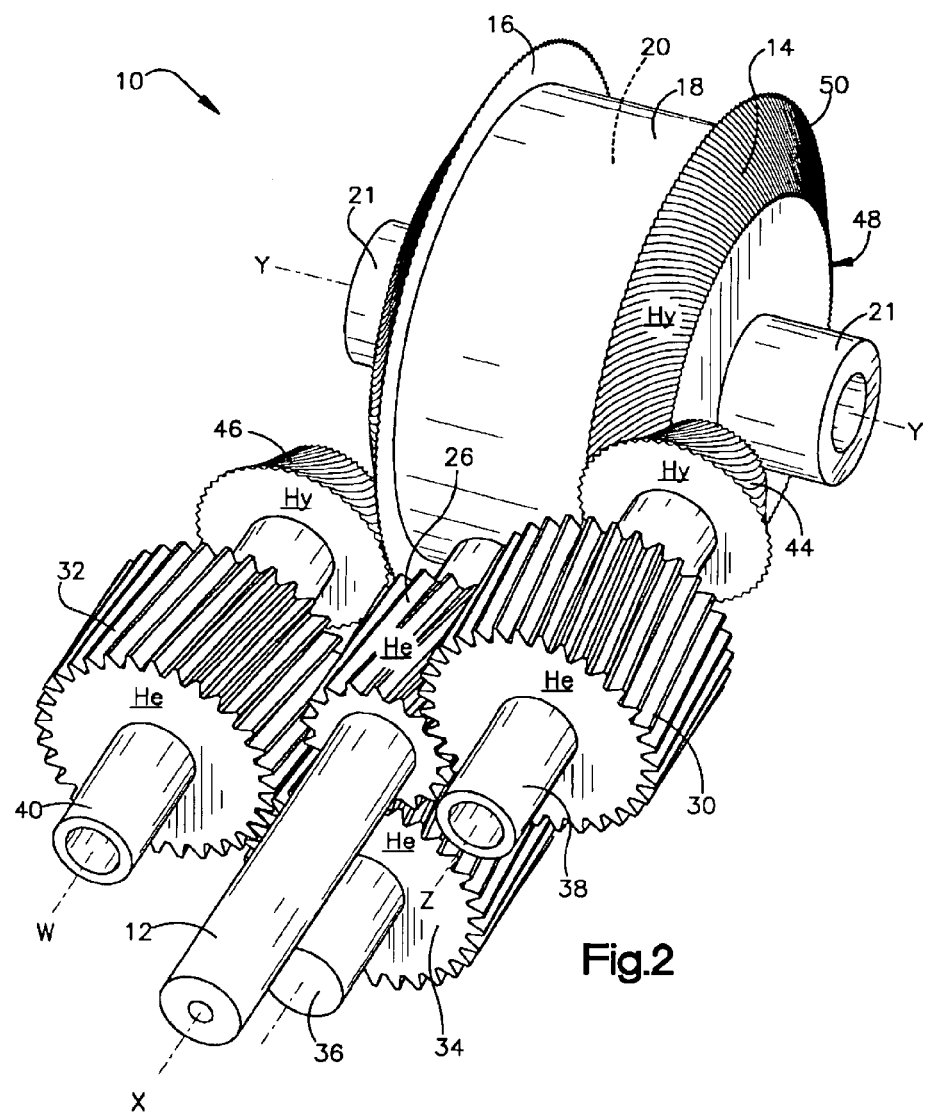
FIG. 2 is a perspective view similar to that of FIG. 1, but showing the axle assembly without the bearings.
Figure 3:
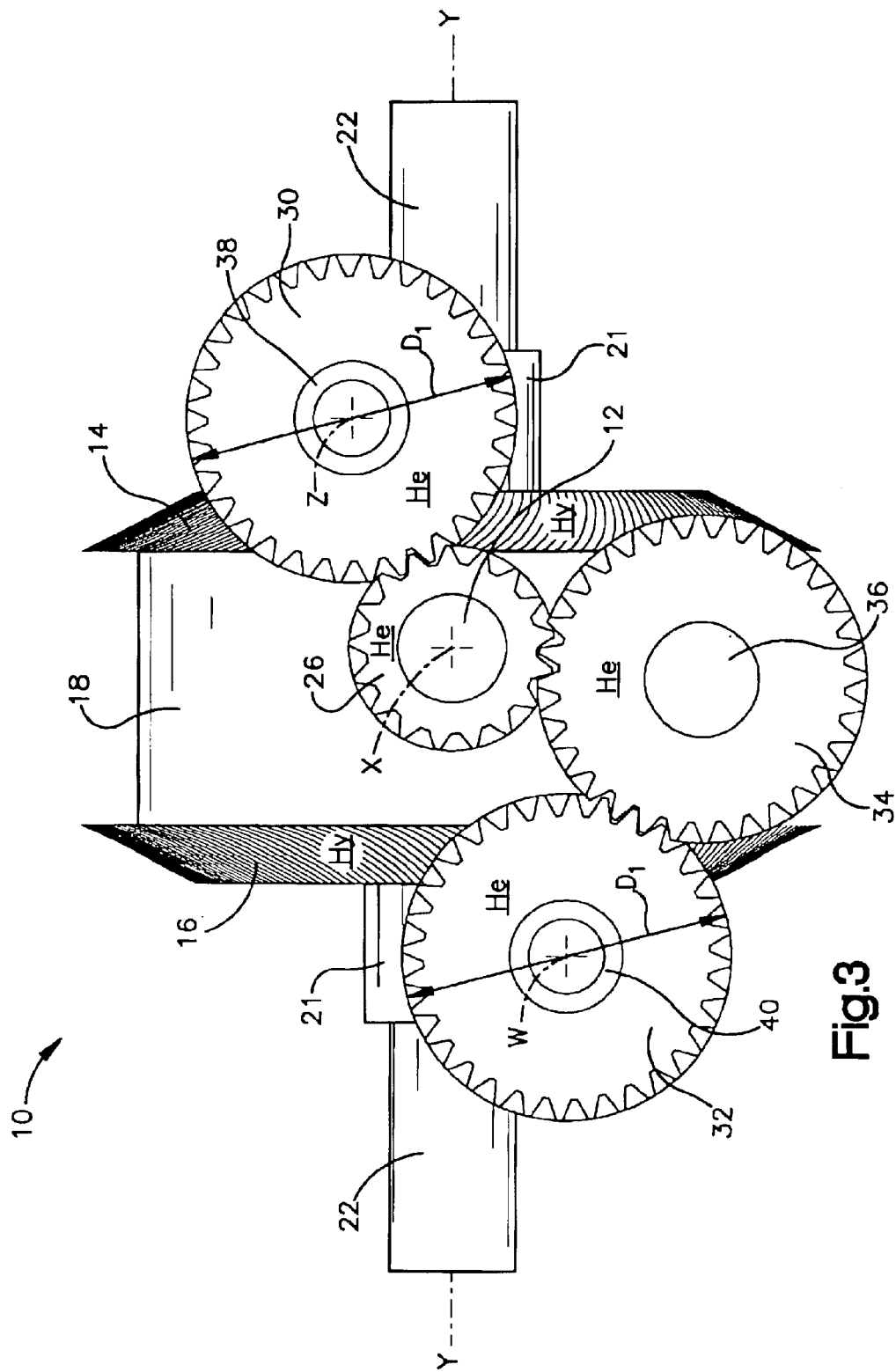
FIG. 3 is a front view of the axle assembly of FIG. 2.
Figure 4:
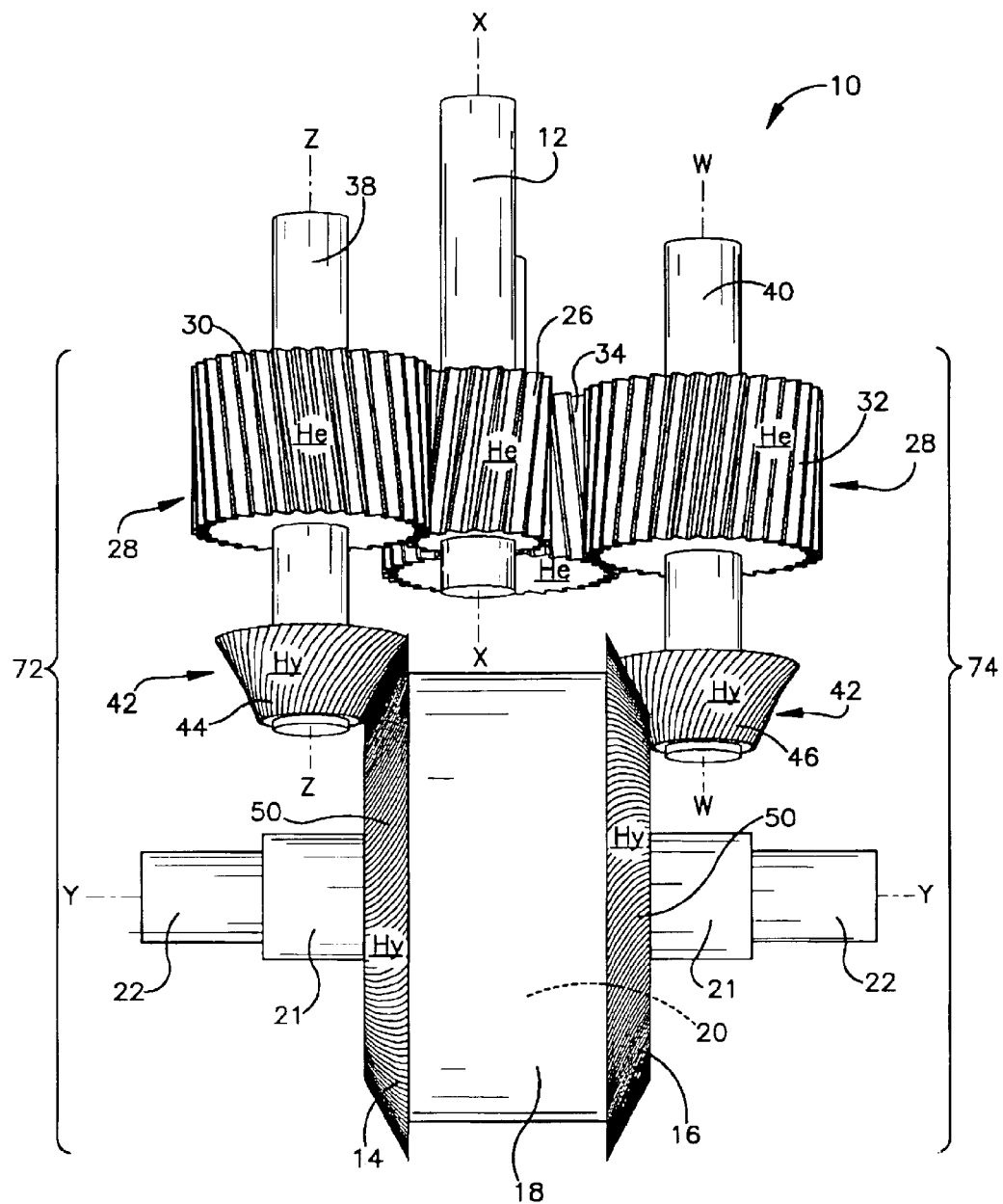
FIG. 4 is a top view of the axle assembly of FIG. 2.
Figure 5:
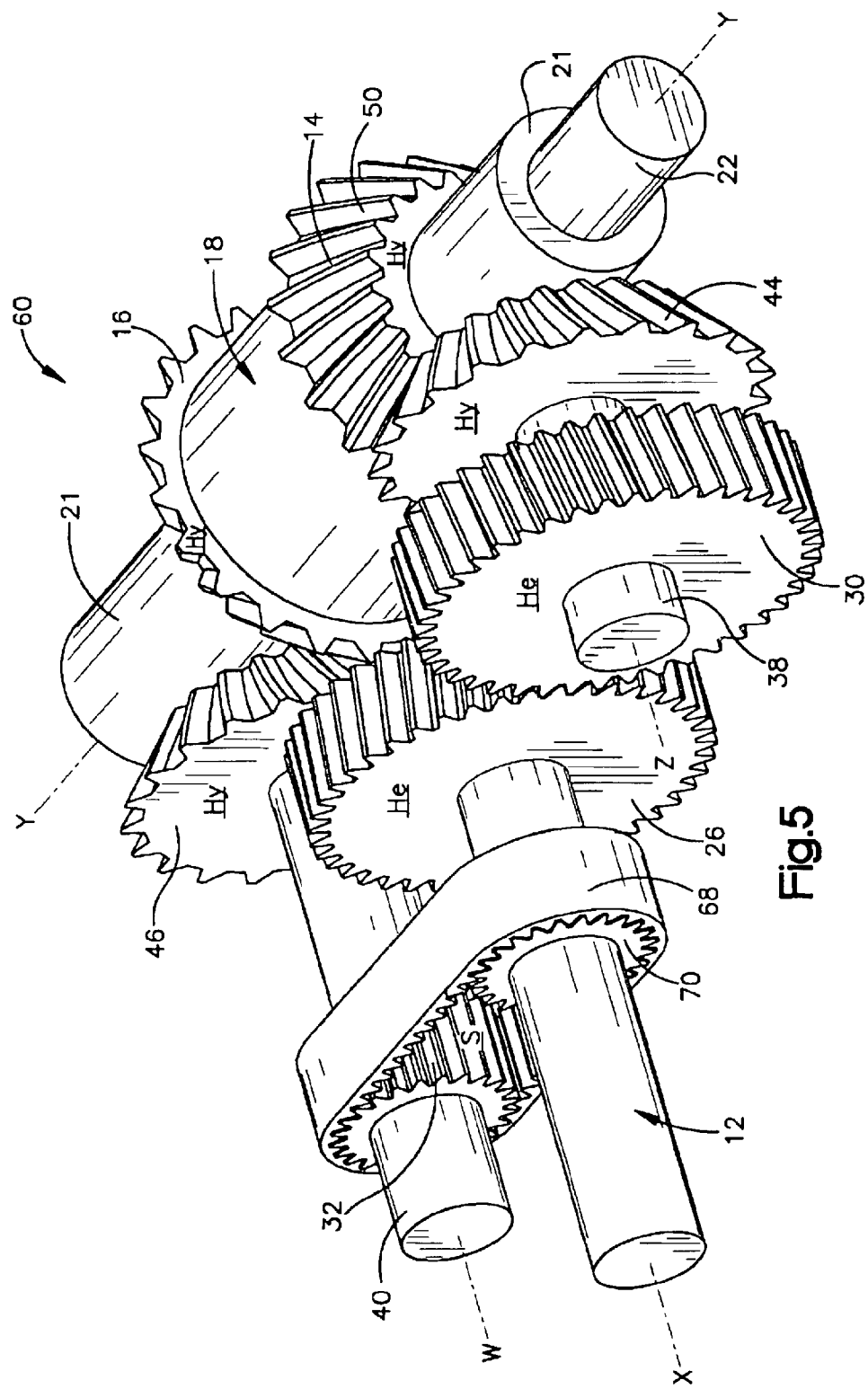
FIG. 5 is a perspective view of a second embodiment of the axle assembly without bearings.
Figure 6:
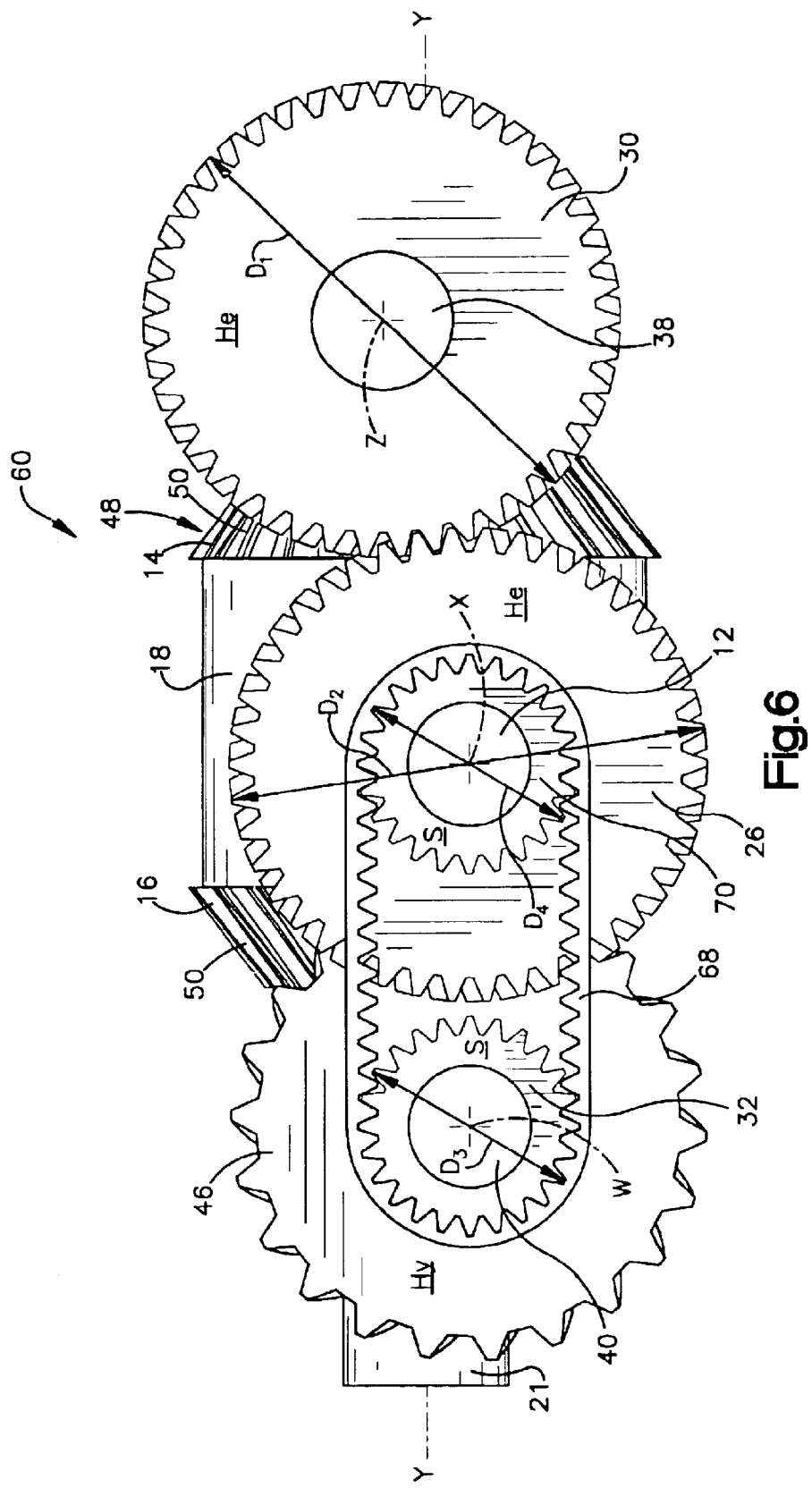
FIG. 6 is a front view of the axle assembly of FIG. 5.
Figure 7:
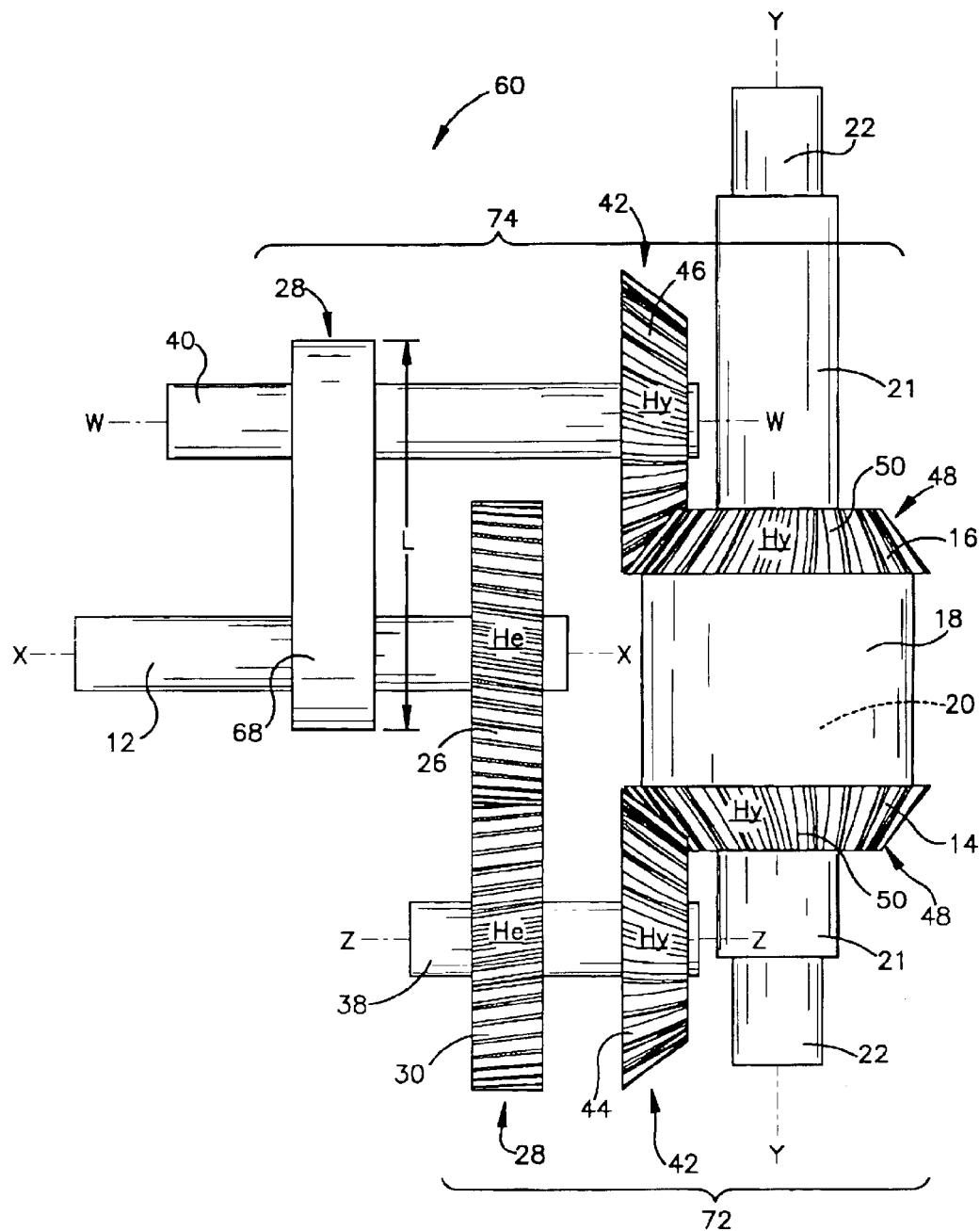
FIG. 7 is a top view of the axle assembly of FIG. 5.

FIGS. 1–4 show a first embodiment 10 of the invention that utilizes "all gears" in transmitting torque to the crown wheels 14, 16. FIGS. 5–7 show a second embodiment 60 of the invention that utilizes gears and a chain drive in combination to transmit torque to the crown wheels 14, 16. An axle assembly 10, 60 will typically utilize gears that are coupled to bearings 24 for rotation about several different shafts. FIG. 1 shows an axle assembly 10 that includes bearings 24. FIGS. 2–7, however, for simplicity sake, depict the axle assembly 10 without bearings. For example, FIGS. 1 and 2 depict a similar gear assembly arrangement, but without the bearings in FIG. 2. A typical axle assembly will have bearings 24, so while the present drawings do not show the bearings in each drawing figure, bearings 24 are preferably included in the assembly 10, 60.

Furthermore, the various gears and shafts of the axle assembly 10 will be positioned in a casing, which is not shown. The casing will typically include a lubricant, which will assist in promoting efficient rotation of the gears with less wear.

Referring to FIGS. 1–4, the all gear version of the split-torque axle assembly 10 is shown as deriving power from a drive shaft 12. The drive shaft 12 rotates about a drive shaft axis X—X and is driven by the vehicle's engine (not shown). The drive shaft 12 may rotate in a first direction in order to drive the vehicle in a forward direction, or in a second direction to drive the vehicle in a reverse direction. A transmission (not shown) is also coupled to the drive shaft 12 for varying the amount of power that is transmitted to the drive shaft 12. The axle assembly has two parallel torque transmission paths 72, 74.

A drive shaft gear 26 is positioned on the drive shaft 12. A preferred location for the drive shaft gear 26 is at the end of the drive shaft 12, although the drive shaft gear 26 may be positioned at other locations on the drive shaft 12. The first torque transmission path 72 is associated with one side of the drive shaft gear 26 while the second torque transmission path 74 is associated with the other side of the drive shaft gear 26.

The drive shaft gear 26 is coupled to a driven gear set 28, which includes a first driven gear 30 and a second driven gear 32. The first driven gear 30 is coupled directly to the drive shaft gear 26 while the second driven gear 32 is spaced from the drive shaft gear 26. An idler gear 34 is positioned between the drive shaft gear 26 and the second driven gear 32. The idler gear 34 changes the direction of rotation of the second driven gear 32 relative to the first driven gear 30, but does not change the speed of the associated gears. Thus, when the drive shaft gear 26 rotates clockwise, the idler gear 34 rotates counterclockwise, the first driven gear 30 rotates counterclockwise, and the second driven gear 32 rotates clockwise. The idler gear 34 is positioned on a shaft 36 which may be secured by the axle assembly casing or otherwise. Other shafts, described below, may also be secured by the axle assembly casing or otherwise.

The first and second driven gears 30, 32 are each positioned to rotate upon separate shafts 38, 40 and the shafts are associated with a driving gear set 42. The driving gear set 42 comprises a third driving gear 44 and a fourth driving gear 46. The two driving gears 44, 46 are utilized to drive the crown wheels 14, 16. The first driven gear 30 and third driving gear 44 are both positioned on a first driven gear shaft 38 so that they rotate together. The second driven gear 32 and fourth driving gear 46 are both positioned on a second driven gear shaft 40 so that they rotate together.

In one embodiment of the invention, either or both of the first and second driven gears 30, 32 are splined to their respective shafts 38, 40 and are axially movable on their shafts 38, 40. Alternatively, or in addition thereto, the idler gear 34 may be splined to the idler gear shaft 36 and may be axially movable on the shaft 36. The position of the first driven gear, second driven gear, and/or idler gear 34 may be fixed on the respective shaft in a conventional manner once an optimized location of the gear is determined, such as by a screw or other suitable attachment method (not shown).

The driving gear set 42 is coupled to a crown wheel gear set 48 which includes the first crown wheel 14 and the second crown wheel 16. The crown wheels 14, 16 are rotatably fixed to one another and rotate together. In a preferred embodiment, the crown wheels 14, 16 are fixed to a differential casing 18, which rotates with the crown wheels 14, 16, and are parallel to one another. In an alternative embodiment, the crown wheels are angled relative to one another.

The differential casing 18 houses a differential mechanism 20, as known by those of skill in the art. The differential mechanism 20 includes a differential axle flange 21 that extends outwardly from either side of the differential casing 18. The two half-shafts 22 of the vehicle's driving wheels pass through the differential axle flange 21 and are splined to the differential gears in the differential mechanism 20 (not shown). Torque is transmitted through the crown wheels 14, 16 and differential casing 18 and the differential mechanism to the driving wheels of the vehicle.

Different types of gears may be utilized for the various components of the axle assembly 10. For example, the driven gears 30, 32, drive shaft gear 26, and idler gear 34 may be a spur S or a helical gear $H_E$. The driving gears 44, 46 may be hypoid $H_Y$, bevel B, or face gears (not shown), and the crown wheels 14, 16 may be hypoid $H_Y$, bevel B, or face gears (not shown). For example, FIG. 1 shows the driven gears 30, 32, drive shaft gear 26, and idler gear 34 as being spur gears S while FIGS. 2–4 show the driven gears 30, 32, drive shaft gear 26, and idler gear 34 as being helical gears $H_E$. FIGS. 1–4 show the driving gears 44, 46 and the crown wheel gears 14, 16 as being hypoid gears $H_Y$.

As shown in FIGS. 1–4, the face 50 of each of the crown wheels 14, 16 faces outwardly, or opposite the opposing crown wheel 14, 16. The gears of the driving gear set 42 mesh with the outward faces 50 of the crown wheel gears 14, 16 to rotatably drive the crown wheel gears 14, 16. By having the crown wheel gears 14, 16 face outwardly so that the driving gears 44, 46 apply rotational force inwardly toward the crown wheels 14, 16, the differential casing 18 is put into compression. In contrast, if the crown wheel gears were to face in the same direction, the driving gears 44, 46 would put the differential casing 18 in tension, which would then require a stronger differential casing 18.

In addition, the assembly 10 is designed such that any axial thrust that is created is counterbalanced. As a result, there is less axial force applied within the assembly which results in less unbalanced forces in the axle housing. When helical gears $H_E$ are used for the driven gears 30, 32, axial thrust may be counterbalanced by optimizing the angle of the helical gear to reduce any axial thrust that is created. An optimized angle of the helical gears $H_E$ allows the helical gears $H_E$ to counterbalance opposite forces on the driving gears 44, 46. By counterbalancing the axial forces within the axle assembly 10, no axial load is applied to the differential casing 18. As a result, the types of bearings 24 that may be utilized may be made simpler and lighter in weight. For example, there is no need to use heavily preloaded taper roller bearings to hold the differential casing 18. Simple ball/roller bearings may be used in their place.

FIG. 3 shows the relative position of the shafts of the various gears relative to each other for a first embodiment of the invention. Each shaft has a longitudinal axis. The drive shaft axis X—X is shown as being offset both vertically and horizontally from the center of the differential casing 18 and the axle axis Y—Y. The axle axis Y—Y is defined by the axis of the two half-shafts 22. The axis Z—Z of the first driven gear 30 is offset from the axle axis Y—Y and is vertically positioned above the axle axis Y—Y. The axis W—W of the second driven gear 32 is also offset from the axle axis Y—Y and is vertically positioned below the axle axis Y—Y. By allowing for offset gear shafts, the overall size of the axle assembly 10 can be reduced, which allows for larger gears that can withstand greater torque and greater road clearance under the vehicle. The idler gear 34 is also shown as being offset both vertically and horizontally from the center of the differential casing 18 and the axle axis Y—Y.

FIG. 3 also shows, for one embodiment of the invention, the positioning of various gears of the axle assembly 10. As shown, the idler gear 34 is positioned below and slightly to the left of the drive shaft gear 26 and the first driven gear 30 is positioned above and to the right of the drive shaft gear 26. The second driven gear 32 is positioned above and to the left of the idler gear 34, but slightly below and to the left of the drive shaft gear 26. Other placements for the gears may also be utilized. The use of offset gear positions is advantageous in that such an axle assembly 10 is easier to manufacture and occupies less space under the vehicle.

As a result of the placement of the first and second driven gears 30, 32, the third and fourth driving gears 44, 46, as shown in FIG. 4, are coupled to the crown wheel gears 14, 16 along a path that is parallel to the axis Z—Z, W—W of the first and second driven gears 30, 32. Thus, the third driving gear 44 meshes with the first crown wheel 14 at a position that is above the axle axis Y—Y and the fourth driving gear 46 meshes with the second crown wheel 16 at a position that is below the axle axis Y—Y.

The above-described placements of the various gears and shafts are for one embodiment of the invention. Other placements may also be utilized, the invention not being limited to a particular positioning or placement of the gears and shafts. The invention provides flexibility in the positioning of the various gears and shafts. This is beneficial because it allows for a reduction in the overall size of the assembly and/or adjustability in the packaging of the assembly. For example, the adjustability in packaging is useful to avoid spacing conflicts between the various components positioned under the vehicle's chassis.

The present invention provides an additional benefit in that it allows for greater ease in changing the axle ratio of the axle assembly 10 than was previously known. For prior axle assembly designs, if the designers wanted to change the axle ratio, they had to redesign the crown wheel. In the present invention, the upstream gears can instead be changed while the crown wheels 14, 16 remain fixed. For instance, the first and second driven gears 30, 32 and drive shaft gear 26 can be changed in order to vary the axle ratio of the axle assembly 10 of FIGS. 1–4 without changing the crown wheel gear set 48. This is advantageous in that the crown wheel gear set 48 can then be used with different axle ratios in different vehicles and models of vehicles, resulting in a cost savings from both a materials and design perspective, among other benefits.

In this embodiment 10, first and second driven gears 30, 32 preferably have the same diameter $D_1$, while the idler gear 34 and drive shaft gear 26 may have a different diameter from the driven gears and from each other. In order to change the axle ratio, the first and second driven gears 30, 32 may be exchanged for replacement first and second driven gears that have a diameter that is different from the first diameter $D_1$. The diameter of the drive shaft gear 26 and of the idler gear 34 can be optimized based on the diameter of the replacement gears.

FIGS. 5–7 show an alternative embodiment of the invention in the form of an axle assembly 60 that utilizes a chain drive. The drive shaft 12 of the axle assembly 60 rotates about a drive shaft axis X—X and is driven by the vehicle's engine (not shown). A drive shaft gear 26 is positioned on the drive shaft 12 for driving the axle assembly 60. A preferred location for the drive shaft gear 26 is at the end of the drive shaft 12, although the drive shaft gear 26 may be positioned at other locations on the drive shaft 12, such as spaced from the end. In one embodiment, the drive shaft gear 26 is splined to and is movable axially on the drive shaft 12, such that it may be fixed at a variety of positions along the length of the drive shaft 12. The drive shaft gear 26 can be fixed to the drive shaft 12 in a conventional manner, such as by utilizing a screw or other suitable attachment method (not shown).

The drive shaft gear 26 is coupled to a driven gear set 28, which includes a first driven gear 30 and a second driven gear sprocket 32. The first driven gear 30 is coupled directly to the drive shaft gear 26 while the second driven gear sprocket 32 is spaced from the drive shaft gear 26. A chain drive that includes a chain 68 is coupled between the drive shaft 12 and the second driven gear sprocket 32. A sprocket 70 is positioned on the drive shaft 12 in transverse alignment with the second driven gear sprocket 32. In addition, the second driven gear sprocket 32 is preferably a sprocket, or a similar gear designed to mesh with the chain 68 of the chain drive. The chain 68 is positioned between the drive shaft sprocket 70 and the second driven gear sprocket 32.

The axle assembly has a first torque transmission path 72 that is associated with the first driven gear 30, and a second torque transmission path 74 that is associated with the chain 68 drive and second driven gear sprocket 32. The first and second torque transmission paths 72, 74 are preferably parallel to one another. The chain 68 rotates the gears of the axle assembly 60 along the second torque transmission path 74 in a direction that is the same as the direction of rotation of the drive shaft 12. The first torque transmission path 72 rotates in a direction that is different and, in a preferred embodiment, opposite from the direction of rotation of the drive shaft 12. As a result, the parallel torque transmission paths 72, 74 rotate in different directions to one another. Thus, when the drive shaft gear 26 rotates clockwise, the first driven gear 30 rotates counterclockwise, the chain 68 rotates clockwise and the second-driven gear sprocket 32 rotates clockwise.

The first driven gears 30 and second driven gear sprocket 32 are positioned on shafts 38, 40 that extend parallel to the drive shaft 12. The first and second driven gear shafts 38, 40 are fixedly coupled to a driving gear set 42 that drives a crown wheel gear set 48. The first driven gear shaft 38 is fixedly coupled to a third driving gear 44 and the second driven gear shaft 40 is fixedly coupled to a fourth driving gear 46. In one embodiment, the first driven gear 30 may be splined to and is movable axially along the length of the first driven gear shaft 38, such that the first driven gear 30 may be fixed at a variety of axial locations along the length of the driven gear shaft 38. The first driven gear 30 may be fixed to the first driven gear shaft 38 using conventional attachment mechanisms, such as a screw or other suitable attachment methods (not shown). In addition, as discussed above, the drive shaft gear 26 may be splined to and be movable axially on the drive shaft 12. The first driven gear 30 and drive shaft gear 26 may both be axially movable, or one of the first driven gear 30 and drive shaft gear 26 may be axially movable.

The crown wheel gear set 48 comprises a first crown wheel 14 and a second crown wheel 16. The first and second crown wheels 14, 16 are fixedly coupled to a differential casing 18, which is positioned between the two crown wheels, such that the first and second crown wheels 14, 16 rotate together. The crown wheels 14, 16 face outwardly and a differential mechanism 20 is positioned inside the differential casing 18. The differential mechanism 20 is coupled to the half-shafts 22 of the driving wheels for driving the vehicle, as known by those of skill in the art.

The third and fourth driving gears 44, 46 are rotatably coupled to the first and second crown wheels 14, 16. Torque from the drive shaft 12 is transferred along the parallel first and second torque transmission paths 72, 74 such that the third and fourth driving gears 44, 46 rotate in opposite directions. Since the third and fourth driving gears 44, 46 rotate in opposite directions, the driving gears 44, 46 mesh with the crown wheels 14, 16 on their outer faces 50 to drive the crown wheel gear set 48, which, in turn, drives the half-shafts 22 and driving wheels of the vehicle.

The first driven gear 30 has a first diameter $D_1$, the drive shaft gear 26 has a second diameter $D_2$, the second driven gear sprocket 32 has a third diameter $D_3$, and the sprocket 70 has a fourth diameter $D_4$. The first and second diameters may be the same or different from one another and the third and fourth diameters may be the same or different from one another. The gear diameters are designed so that the first and second driven shafts 38, 40 rotate at the same speed. Thus, if either of the first driven gear 30 or drive shaft gear 26 are changed, then one or both of the second driven gear sprocket 32 and sprocket 70 will need to be changed in compensation to maintain the same axle ratio.

The embodiment shown in FIGS. 5–7 also provides benefits similar to the embodiment shown in FIGS. 1–4. In particular, the chain drive embodiment allows the axle ratio of the assembly 60 to be changed by changing some of the upstream components of the axle assembly 60, without the need to change the design of the crown wheels 14, 16. In order to change the axle ratio, the drive shaft gear 26, first driven gear 30, the second driven gear sprocket 32, sprocket 70 on the drive shaft 12, and chain 68 are properly dimensioned to provide a change in axle ratio using the same crown gears.

The gears within the axle assembly 60 of FIGS. 5–7 can be a number of different types. The first driven gear 30 can be a spur S or helical $H_E$ gear, the second driven gear sprocket 32 can be a spur or other gear, and the drive shaft gear 26 can be spur S or helical $H_E$ gears. The third and fourth driving gears 44, 46 can be hypoid $H_Y$, bevel B, or face (not shown) gears and the crown wheels 14, 16 can be hypoid $H_Y$, bevel B, or face (not shown) gears.

In a manner similar to that discussed above for FIGS. 1–4, the axial thrust on the first and second driven gear shafts 38, 40 may be balanced, where helical gears are utilized, by selecting an optimum helix angle for the helical gears $H_E$. By providing a balanced system, forces on the differential casing 18 are essentially avoided so that bearings 24 may be made smaller and less cumbersome.

The present invention also provides a method for changing the axle ratio of an axle assembly 60. Currently, in order to change axle ratios, the crown wheel must be changed. As previously discussed, it is only necessary to change some of the gears that are positioned upstream of the crown wheels 14, 16 in order to alter the axle ratio. This is beneficial because it allows the same crown wheels 14, 16 to be utilized with many different axle ratios. The same crown wheels 14, 16 may then be utilized on different types of vehicles with different levels of torque. This results in a cost savings since like parts can be used across different vehicle families.

A first embodiment of the method involves utilizing the axle assembly 10 of FIGS. 1–4 where the first and second driven gears 30, 32 have a first diameter $D_1$. The method involves replacing the first and second driven gears 30, 32 with a set of replacement gears that have a diameter, which is different from the first diameter $D_1$. The method also involves replacing the drive shaft gear 26, which has a second diameter $D_2$, with a replacement drive shaft gear that has a diameter that is different from the second diameter $D_2$.

A second embodiment of the method involves utilizing the axle assembly 60 of FIGS. 5–7. In this embodiment, the first driven gear 30 has a first diameter $D_2$ and the drive shaft gear 26 have a second diameter $D_2$. The second driven gear sprocket 32 has a third diameter $D_3$ and the sprocket 70 has a fourth diameter $D_4$. The chain 68 has a first length L. The method involves replacing the first driven gear 30 and the drive shaft gear 26 with a replacement first driven gear and a replacement second drive shaft gear. The method also involves replacing the second driven gear sprocket 32 and sprocket 70 with a suitable replacement set of sprockets. The method further provides for replacing the chain with a replacement chain having a length different from the first length L.

The invention also relates to a method of adjusting backlash within an axle assembly. Backlash in gear trains, as known by those of skill in the art, is often caused by gaps that exist between the gear teeth in adjoining gears within a gear train. When numerous gears are utilized in a gear train, backlash can cause clanking and related noise within the system, which is undesirable. The present invention provides an adjustability feature that is particularly applicable when helical gears are utilized for the driven gear set, which allows the gaps between the gear teeth of adjacent gears to be adjusted to preferably reduce and/or eliminate backlash within the axle assembly. For instance, in the embodiments shown in FIGS. 1–4, one or more of the first and second driven gears 30, 32 and idler gear 34 may be splined to and movable axially on their respective shafts 38, 40, 36. Backlash can be adjusted by moving one or more of the first and second driven gears 30, 32 or idler gear 34 axially to an optimized position, as known by those of skill in the art, until a desired fit occurs between the gear teeth of the driven gears 30, 32 and idler gear 34 and their adjacent gears. Once an optimized position is determined the first driven gear 30, second driven gear 32, and/or idler gear 34 are fixed positionally to their respective shafts. By selecting an optimum axial position for one or more of the first and second driven gears 30, 32 and idler gear 34, backlash within the axle assembly may be adjusted.

The same is true for the embodiment of FIGS. 5–7. In this embodiment, the first driven gear 30 and drive shaft gear 26 may be splined to and be movable axially on their respective shafts 38, 12. By moving one or both of the first driven gear 30 and drive shaft gear 26 axially, the gaps between the gear teeth of the adjacent gears 70, 32, 26, 30 are adjusted, which results in an adjustment of the backlash within the axle assembly, as known by those of skill in the art. As with the embodiments discussed in connection with FIGS. 1–4, once an optimized position for the first driven gear 30 and/or drive shaft gear 26 is determined, the gear 30, 26 is fixed positionally to the associated shaft. Thus, backlash in the axle assembly may be adjusted by axially adjusting the position of one or both of the first driven gear 30 and drive shaft gear 26.

It should be noted that the various gears shown in the drawings are for illustration purposes. Actual gears incorporating the invention may differ in appearance from those depicted in the drawings. Moreover, the size and shape of the gears and gear teeth may vary from that shown. Furthermore, the shafts described above are shown as being both hollow and solid in the various views. It should be noted that the shafts may be either hollow or solid, the invention not being limited to a particular type of shaft.

While various features of the claimed invention are presented above, it should be understood that the features may be used singly or in any combination thereof. Therefore, the claimed invention is not to be limited to only the specific embodiments depicted herein.

Further, it should be understood that variations and modifications may occur to those skilled in the art to which the claimed invention pertains. The embodiments described herein are exemplary of the claimed invention. The disclosure may enable those skilled in the art to make and use embodiments having alternative elements that likewise correspond to the elements of the invention recited in the claims. The intended scope of the invention may thus include other embodiments that do not differ or that insubstantially differ from the literal language of the claims. The scope of the present invention is accordingly defined as set forth in the appended claims.

What is claimed is:

1. An axle assembly for transmitting power between a drive shaft and driven wheels of a vehicle, with first and second half shafts coupled to the driven wheels, said axle assembly comprising:

at least two crown wheels fixed to one another for rotation together about an axle axis, said axle axis being defined by the half shafts of the driven wheels, said at least two crown wheels comprising a first crown wheel and a second crown wheel;

at least two driven gears rotatably coupled to the drive shaft of the vehicle, said driven gears comprising a first driven gear and a second driven gear;

at least two driving gears, each of which is rotatably coupled between one of the driven gears and one of the crown wheels, said driving gears for driving the rotation of the at least two crown wheels, said driving gears comprising a third driving gear and a fourth driving gear; and a mechanism coupled to the drive shaft between the first and second driven gears for rotating the first driven gear in a direction opposite to the rotation of the second driven gear, wherein the mechanism comprises:

a drive shaft gear positioned on the drive shaft; and an idler gear, wherein one of the driven gears is rotatably coupled directly to the drive shaft gear and the idler gear is coupled between the drive shaft gear and the other driven gear.

2. An axle assembly for transmitting power between a drive shaft and driven wheels of a vehicle, with first and second half shafts coupled to the driven wheels, said axle assembly comprising:

a drive shaft gear positioned on the drive shaft;

a driven gear set rotatably coupled to the drive shaft gear comprising at least two driven gears and an idler gear, wherein the drive shaft gear is positioned between the two driven gears and the idler gear is positioned between the drive shaft gear and one of the driven gears, said idler gear for changing the direction of rotation of one of the driven gears so that the at least two driven gears rotate in different directions;

a driving gear set comprising at least two driving gears, with each driving gear being associated with at least one of the driven gears; and a crown wheel gear set comprising at least two crown wheel gears that are rotatably fixed to one another, with each of the crown wheel gears being coupled to one of the driving gears;

wherein the drive shaft gear rotates the driven gear set, which rotates the driving gear set, which rotates the crown wheel gear set, which rotates the first and second half shafts to drive the driven wheels.

3. The axle assembly of claim 2, further comprising a differential casing containing a differential mechanism coupled to the crown wheel gear set and being associated with the first and second half shafts of the vehicle.

4. The axle assembly of claim 2, wherein the two driven gears are identical to one another.

5. The axle assembly of claim 2, wherein at least one of the at least two driven gears and the idler gear is axially movable.

6. The axle assembly of claim 2, wherein the first and second half shafts lie on an axle axis, the crown wheel gear set rotates about the axle axis, and the drive shaft gear lies on a drive shaft axis, which is perpendicular to the axle axis.

7. The axle assembly of claim 6, wherein the drive shaft axis is vertically offset from the axle axis.

8. The axle assembly of claim 2, wherein the drive shaft gear is one of a spur gear or a helical gear, the driven gears are one of a spur or a helical gear, the idler gear is one of a spur or a helical gear, the driving gear are one of a hypoid, bevel, or face gear, and the crown wheel gears are one of a hypoid, bevel, or face gear.

9. The axle assembly of claim 6, wherein the drive shaft axis is vertically aligned with the axle axis; and the driven gears comprise a first driven gear having an axle and a second driven gear having an axle, and the first and second driven gear axles each have axes that are vertically offset from the axle axis.

10. The axle assembly of claim 9, wherein the first driven gear axle is vertically offset from the second driven gear axle.

11. The axle assembly of claim 2, wherein the driven gears comprise a first driven gear having an axle and a second driven gear having an axle, and at least one of the first driven gear and second driven gear are movable axially on the associated axle and fixable at an optimized position on the associated axle.

12. The axle assembly of claim 2, wherein each of the at least two driven gears are coupled to the at least two driving gears by at least one shaft, with the at least two driven gears and the at least two driving gears being rotatable about the at least one shaft.

13. A method of varying the axle ratio of an axle assembly comprising:

providing the axle assembly of claim 4, wherein the at least two driven gears have a first diameter; and replacing the at least two driven gears with at least two replacement driven gears having a second diameter, wherein the second diameter is different from the first diameter.

14. The method of claim 13, further comprising replacing the drive shaft gear with a differently sized drive shaft gear.

15. A method of adjusting the backlash within an axle assembly comprising:

providing the axle assembly of claim 7, wherein the first driven gear is positioned on a first driven gear axle, the second driven gear is positioned on a second driven gear axle, and the idler gear is positioned on an idler gear axle, and at least one of the first and second driven gears and idler gear are splined to their respective axles;

moving an axial position of at least one of the first end second driven gears and idler gear until the backlash within the axle assembly is adjusted; and fixing the axial location of the at least one of the first and second driven gears and idler gear.

* * * * *

UNITED STATES PATENT AND TRADEMARK OFFICE
CERTIFICATE OF CORRECTION

PATENT NO. : 6,855,087 B2
DATED : February 15, 2005
INVENTOR(S) : Jyotsnamoy Chakraborty It is certified that error appears in the above-identified patent and that said Letters Patent is hereby corrected as shown below:

Column 11,
Line 19, delete the second instance of "gear" and insert -- gears --.

Column 12,
Line 10, delete "4" and insert -- 2 --.
Line 27, delete "end" and insert -- and --.

Signed and Sealed this

Thirty-first Day of May, 2005

JON W. DUDAS
*Director of the United States Patent and Trademark Office*